No. 626,922. Patented June 13, 1899.
J. H. NAGLE.
DUST OR WATER PROOF CASING FOR FIELDS OF ELECTRIC MOTORS.
(Application filed Apr. 6, 1899.)
(No Model.)
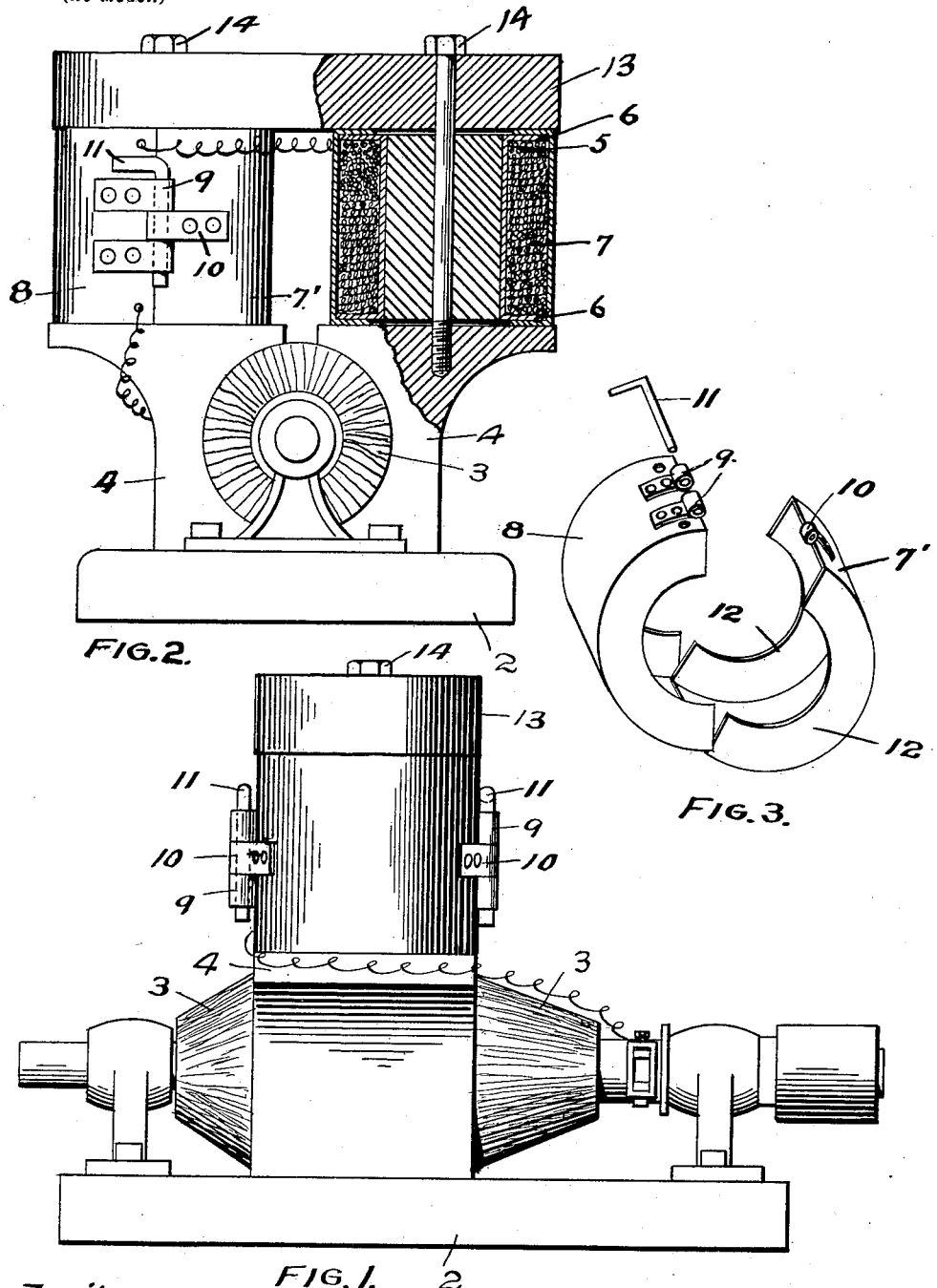
Witnesses,
Inventor,
James H. Nagle.
By Paul & Hawley
His attorneys.

UNITED STATES PATENT OFFICE.

JAMES H. NAGLE, OF MINNEAPOLIS, MINNESOTA.

DUST OR WATER PROOF CASING FOR FIELDS OF ELECTRIC MOTORS.

SPECIFICATION forming part of Letters Patent No. 626,922, dated June 13, 1899.

Application filed April 6, 1899. Serial No. 711,953. (No model.)

*To all whom it may concern:*

Be it known that I, JAMES H. NAGLE, of the city of Minneapolis, county of Hennepin, State of Minnesota, have invented certain new and useful Improvements in Dust or Water Proof Casings for Fields of Electric Motors, of which the following is a specification.

The invention relates to protective shells or casings for electric-motor fields; and the objects of the invention are, first, to provide means for thoroughly protecting the fields of an electric motor from dust and moisture; second, to provide protective means that will not add materially to the cost of the motor, that can be readily removed to permit access to the fields, and can be easily adapted to fit the various modifications of motor-fields and the different positions in which said fields are placed with respect to the armature.

The invention consists generally in a casing or shell formed of two independent sections having their abutting edges connected together to permit the casing to be opened from either side.

Further, the invention consists in a casing, which may be polygonal in form, divided longitudinally into independent sections having at their ends inwardly-turned flanges and detachably secured together at their abutting edges.

Further, the invention consists in a hollow casing, open at the ends, divided longitudinally into independent sections having inwardly-projecting flanges at the end and hinged together at their abutting edges to permit the casing to be opened from either side.

Further, the invention consists in the combination, with the core or spool of an electric-motor field, of a shell or casing inclosing said field and having inwardly-extending flanges to overlap the flanges of the field or spool and means for drawing said casing and said field closely together.

Further, the invention consists in a motor base or frame, the fields mounted thereon, shells or casings inclosing said fields, each composed of two independent sections hinged together, each section having inwardly-turned flanges to overlap the edges of the fields and exclude dust and moisture therefrom, a cap for the top of said fields, and means for drawing down said cap to form a close joint between said shell or casing and said fields.

Further, the invention consists in various constructions and combinations, all as hereinafter described, and particularly pointed out in the claims.

In the accompanying drawings, forming part of this specification, Figure 1 is a side elevation of an electric motor with my invention attached thereto. Fig. 2 is an end view with one of the fields shown in section. Fig. 3 is a detail perspective view of the casing or shell.

In the drawings, 2 represents the base of a motor of the ordinary or any preferred construction, whereon an armature 3 is mounted, its middle portion being preferably inclosed by the upright cast members or parts 4, having flat upper surfaces whereon the fields of the motor are placed. These fields may be of any preferred form; but, as I have shown, each consists, preferably, of a core 5, having laterally-extending flanges 6 at its ends, the wires 7 being wound about the core between the flanges. To prevent dust and moisture from obtaining access to said shells, I prefer to provide a shell or casing, preferably of metal, for each field, said casing being cylindrical, oval, or polygonal in cross-section and consisting, preferably, of parts 7' and 8, which may be semicylindrical or in any other preferred form, according to the shape of the fields, and having their abutting edges provided with straps 9 and 10, having looped ends which interlock when the ends of the casing are brought together in position to form sockets to receive the pins 11, thus forming hinges upon each side of the casing, which permits the casings to be opened and access to the fields upon either side and by means of which the parts 7' and 8 are locked firmly together. Each part or member of said casing is also preferably provided with an inwardly-extending flange 12 at each end, the ends of said flanges abutting when the two parts of the casing are placed together, and when placed around the field said flanges overlap the flanges 6, and the flanges at the bottom of the casings rest upon the flat surface of the parts 4, and the fields are thus completely inclosed on the sides and protected from dust and moisture. The motor is also provided with the usual cap 13, placed upon the top of the fields, resting upon the flanges at the top of the casings, said cap being provided with openings registering with similar openings in the cores of the fields to receive bolts 14, having threaded lower ends to enter threaded openings in said parts or members 4, so that when the casings have been placed in position inclosing the fields by turning up the bolts 14 the cap 13 may be drawn down and said casings and fields drawn together and a dust and water proof joint formed between them. By loosening the bolts 14 and removing the pins 11 access may had to each side of either field. Openings are provided in the casings through which wires pass between the fields and to the commutator.

Instead of making the shell or casing cylindrical in form it may be oval or square in cross-section or in any preferred form, according to the shape of the field to be inclosed. Obviously the position and shape of the fields shown herein may be varied, and I therefore do not confine myself to the form of the casing described.

Having thus described my invention, I claim as new and desire to secure by Letters Patent—

1. A casing for electric-motor fields, comprising independent parts or members, means for connecting their abutting edges, and flanges provided at the ends of said members and adapted to overlap the edges of a field, substantially as described.

2. A casing for electric-motor fields, comprising two semicylindrical shells, means connecting the abutting edges of said shells to permit access to either side of the field, and flanges provided upon the ends of said shells and adapted to overlap the ends of the fields, substantially as described.

3. In an electric motor, the combination, with a field, of a shell or casing inclosing the same and comprising independent sections having their abutting edges secured together, flanges provided at the ends of said sections and overlapping the ends of the field, a cap for said field and means for securing the same to the motor and thereby drawing said casing and said field closely together, substantially as described.

4. In an electric motor, the combination, with the parts or members 4, of the fields 5 thereon having flanges 6, the casings inclosing said fields and comprising the independent shells 7 and 8 having their abutting edges secured together, the flanges 12 provided on said sections and overlapping said flanges 6, a cap 14 mounted on said fields and the bolts 14 whereby said cap, said fields, and said parts or members 4 are secured together, substantially as described.

5. The combination, with a motor base or frame and the fields mounted thereon, of shells or casings inclosing said fields, each of said casings being composed of two independent sections hinged together, each section having at its ends inwardly-turned flanges to overlap the ends of the fields, a cap for the top of said fields, and means for securing said cap to the motor-frame and compressing said casings and said fields to form a dust and water proof joint between the flanges of said casings and said fields, substantially as described.

In witness whereof I have hereunto set my hand this 1st day of April, 1899.

JAMES H. NAGLE.

In presence of—
A. C. PAUL,
A. F. HOLMES.